United States Patent [19]

Katbi et al.

[11] Patent Number: 5,230,591
[45] Date of Patent: Jul. 27, 1993

[54] INSERT FOR LIGHT FEED, LIGHT DEPTH OF CUT

[75] Inventors: Karl Katbi; Sreedwaraka P. Boppana, both of Troy; Brendan L. Brockett, Dearborn Heights, all of Mich.

[73] Assignee: GTE Valenite Corporation, Troy, Mich.

[21] Appl. No.: 926,442

[22] Filed: Aug. 10, 1992

[51] Int. Cl.⁵ .............................................. B23B 27/22
[52] U.S. Cl. ..................................... 407/114; 407/116
[58] Field of Search ................ 407/113, 114, 115, 116

[56] References Cited

U.S. PATENT DOCUMENTS

| | | | |
|---|---|---|---|
| 3,383,748 | 5/1968 | Galimberti et al. | 407/114 |
| 3,882,580 | 5/1975 | Lundgren | 407/114 |
| 3,968,550 | 7/1976 | Gehri | 407/114 |
| 4,626,141 | 12/1986 | Malaker et al. | 407/114 |
| 5,032,049 | 7/1991 | Hessman et al. | 407/114 |

FOREIGN PATENT DOCUMENTS

| | | | |
|---|---|---|---|
| 65124 | 11/1982 | European Pat. Off. | 407/114 |
| 374800 | 6/1990 | European Pat. Off. | 407/114 |
| 260238 | 9/1968 | German Democratic Rep. | 407/114 |

Primary Examiner—William E. Terrell
Attorney, Agent, or Firm—Bill C. Panagos

[57] ABSTRACT

A polygonal lay down indexable cutting insert for a centrally located island and light feed and light depth of cut applications. The insert has a variable land surface angle which is 14° at each corner of the insert and merges into a 12° as measured along the flanks of the insert. A second descending angle is 27° along the flanks. The corners are radiused along the variable land surface and the descending angle surfaces to impart better strength and cutting for the insert. Moreover, the first variable descending angle is greater than the first variable descending angle along the flanks of the insert.

8 Claims, 2 Drawing Sheets

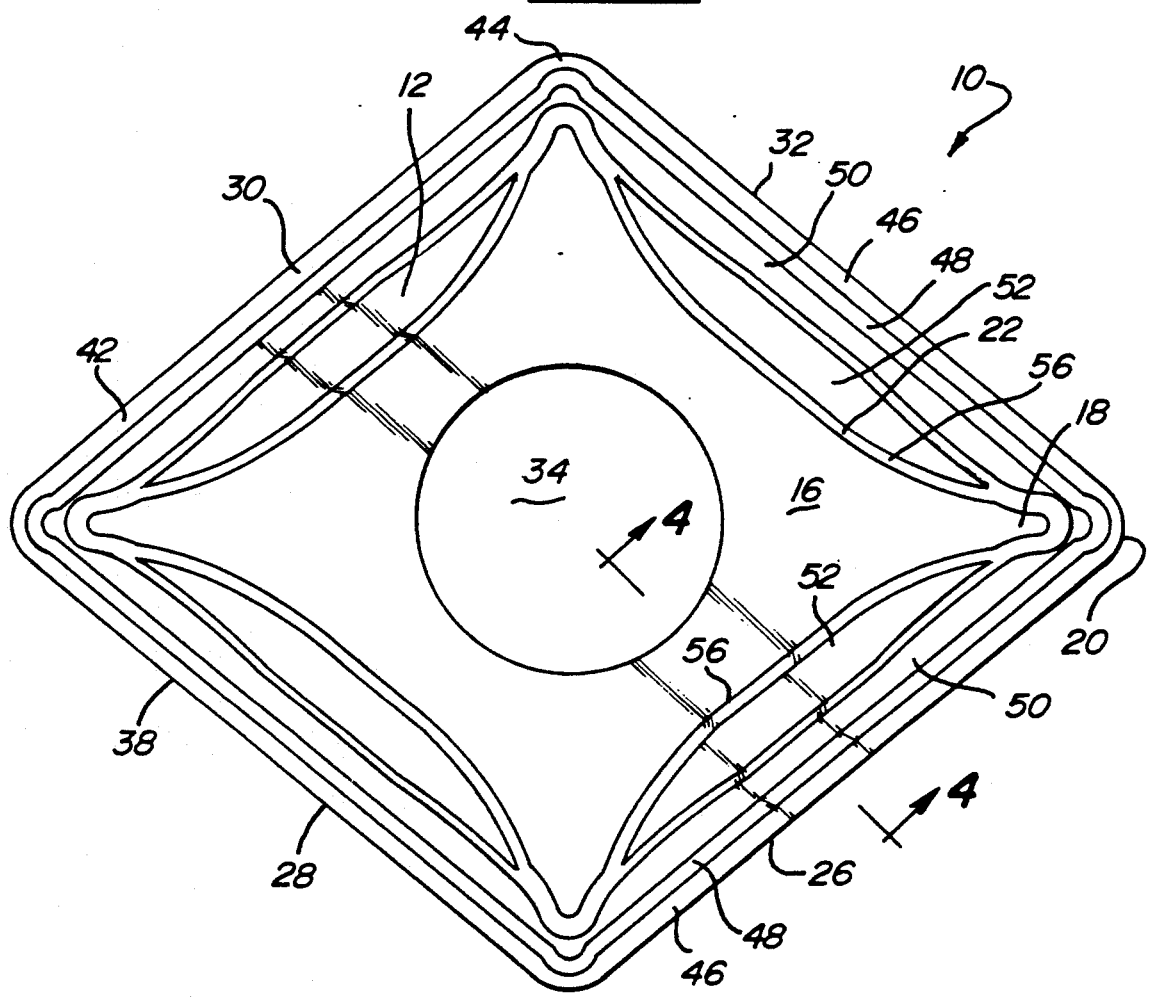
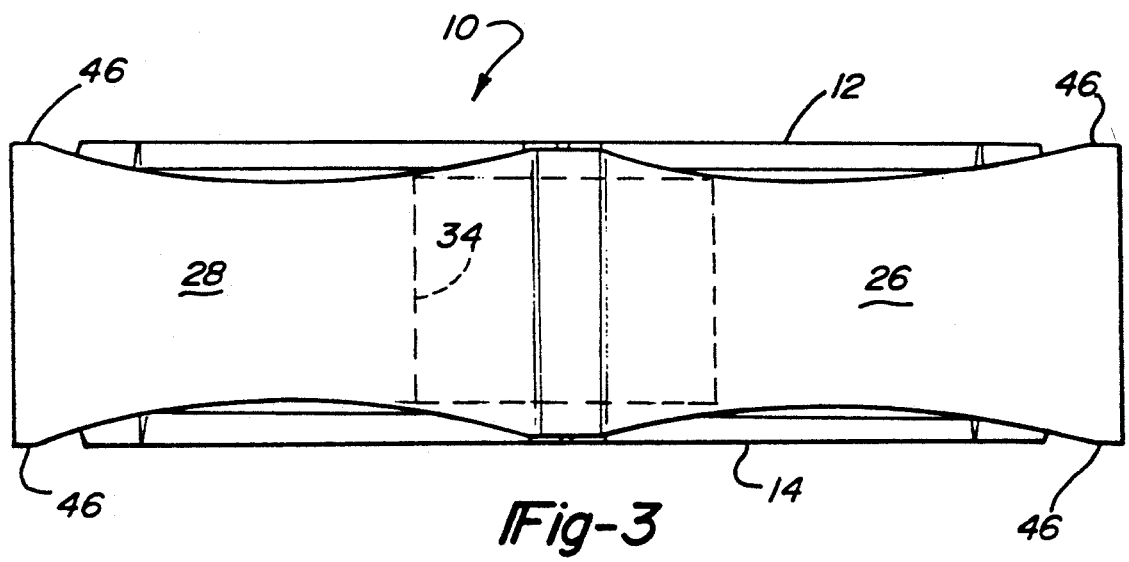

INSERT FOR LIGHT FEED, LIGHT DEPTH OF CUT

BACKGROUND OF THE INVENTION

The present invention relates to a cutting insert for light feed and light depth of cut applications for turning ductile material such as steel.

The present invention also relates to an insert for light feed and light depth of cut having variable land angles, including a first and second variable land angle with a plurality of support pads along the cutting edge which are useful for profiling and backfacing operations. The insert further is provided with seating pads to allow coolant and reduce chip friction. The insert further provides land surfaces which are variable in width, i.e. the width of the land at the corners of the insert is less than the width along the flanks.

SUMMARY OF THE INVENTION

The present invention relates to a polygonal lay down indexable cutting insert for light feed and light depth of cut applications. The insert comprises a top surface which has a raised, centrally located raised island, having nose portions at each corner of the insert. The nose portions of the raised island are separated from each other by inversely arcuate side regions of the centrally located island. The insert also has a bottom surface substantially parallel to the top service and having a raised centrally located island of the same shape as the island on the top surface. A side wall extends substantially unbroken between the top and bottom surfaces to form the body. The side wall is comprised of a plurality of component side flanks, each of which extends from corner to corner of the polygonal cutting insert. A cutting surface is formed at the meeting of each component side flank on the top and bottom surfaces. The cutting surface is comprised of a cutting edge which is in the shape of a descending arc as measured from each corner to each adjacent corner of the insert. The cutting surface further has a variable width land surface extending rearwardly from the cutting edge. The descending land surface is radiused at each corner of the insert and of a narrower width at the corners than along the flanks of the insert body. The land surface has a variable first descending land angle which is greater at each corner than along the side flanks. There is further provided a variable second descending land angle which is adjacent to and rearward of the first variable land angle. The variable secondary land angle extends toward a groove width surface. The second variable land angle surfaces are radiused at each corner of the insert body. The groove width surface has a variable width along each flank of the insert body. The groove width is narrower at each corner of the insert than along the flanks of the insert. A chip deceleration pad is located at each inversely arcuate side region of the island. The deceleration pad and island share a first variable width ascending angle rising from the groove width to the declaration pad and the nose portion of the island. A second variable width ascending angle surface raised from the deceleration pad to the surface of the centrally raised island.

The insert may be further equipped with a centrally located hole extending at least partially through the insert body from the top to the bottom surface in order to facilitate securing the insert into a pocket of a tool holder.

BRIEF DESCRIPTION OF THE DRAWINGS

FIG. 2 is a top plan view of the polygonal lay down indexable cutting insert.

FIG. 3 is an on-side view of the polygonal lay down indexable cutting insert showing the descending arcuate cutting surfaces.

DETAILED DESCRIPTION OF THE PREFERRED EMBODIMENT

Figure 1:
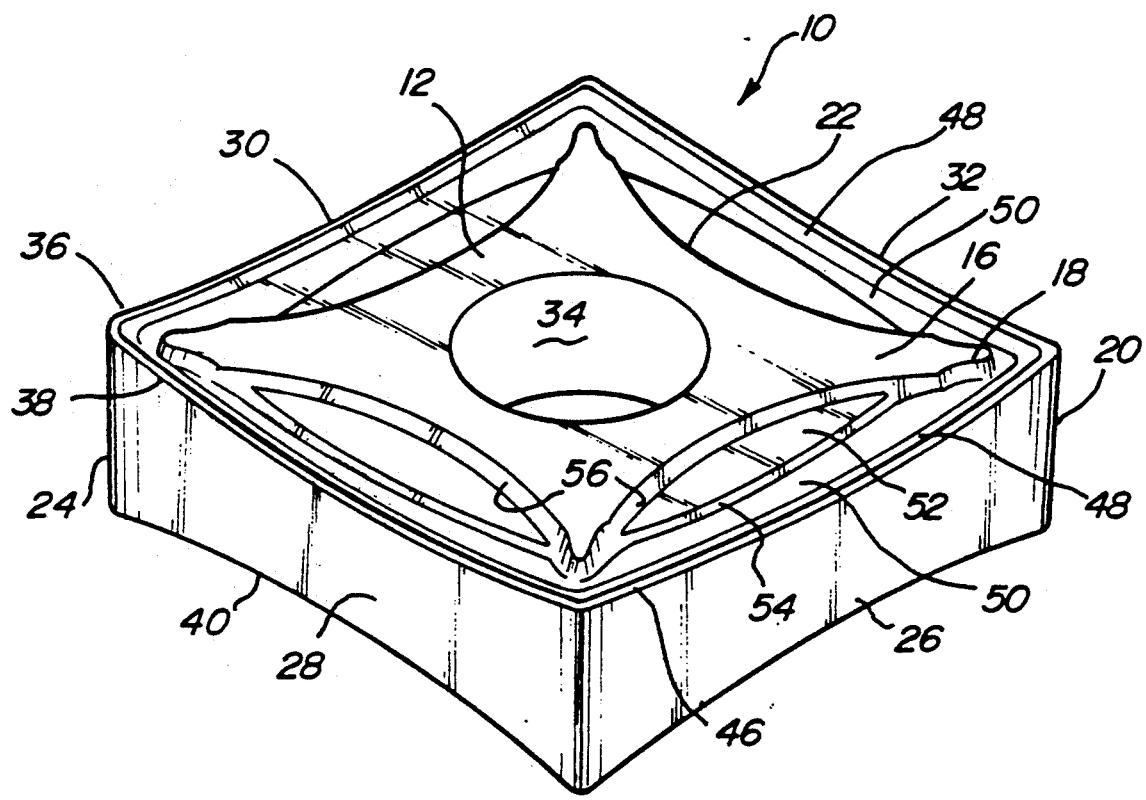
FIG. 1 is a top perspective view of the polygonal lay down indexable cutting insert.
Figure 4:
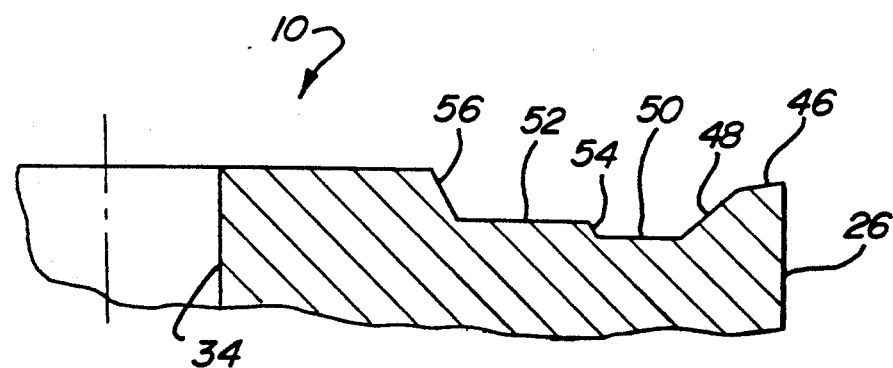
FIG. 4 is a cross sections view of the polygonal lay down indexable cutting insert along line 4—4 of FIG. 2.

Turning now to the Figures were like numerals reference like structures, polygonal insert 10 is comprised of a top surface 12 and bottom surface 14. A central island 16 is disposed on top surface of the insert and a like central island is disposed on the bottom surface of the insert. The insert may further be equipped with a centrally located hole 34 on the island, extending at least partially through the body of the insert. The central island is roughly diamond shaped, having island nose portions 18 located in close proximity to insert corners 20 and separated from each other island nose portion by an inversely arcuate side region 22. A sidewall 24 extends substantially unbroken around the top and bottom surface to define the body of the insert. The sidewall is comprised of component side flanks 26, 28, 30, and 32. Each side flank is defined as that portion of the sidewall between the corners of the insert. There is also provided in the island, a central aperture 34 which extends at least partially through the body of the insert to allow the insert to be secured in a tool holder pocket (not shown) such as is customary in the art.

A cutting surface 36 extends substantially along the entire perimeter of the insert top and/or bottom surface. The cutting surface is comprised of a cutting edge 38, which is defined as the edge formed between the meeting of any of the components side flanks and the top and bottom surface. The cutting edge is in the shape of a descending arc 40 which is defined as an arc measured from corner to each adjacent corner of the insert. Extending rearwardly from the cutting edge is a variable width land surface 42 which extends rearwardly from the cutting edge and is radiused at each corner of the insert. The variable width cutting land surface 42 is of narrower width at the corners 20 of the insert than along the flanks of the insert body. The variable width land surface is radiused at sections 44 of the insert. The variable width land surface has a variable first descending land angle 46 which preferably causes the variable width land surface to be disposed at a positive rake angle. Preferably, the first variable descending land angle is 14° at each corner of the insert and merges to a 12° along the flanks of the insert. Those skilled in the art recognize that any angles can be used as the first variable descending land angle so long as the first variable descending land angles at the corners of the insert are greater than the first variable descending land angle of the surface along the flanks of the insert.

Figure 5:
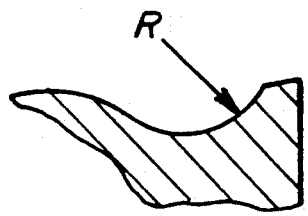
FIG. 5 is a detailed cut away side view of the corner portions of the insert.

Extending rearwardly from the variable first descending land angle is a variable second descending land angle 48. The variable second descending land angle extends rearwardly from the first variable descending angle and is preferably 27° along the flanks of the insert and descends at a radiused arc at each corner of the insert (FIG. 5). The radiused arc is preferably 0.025 inches. Note that both the first and second variable descending angles surfaces are radiused at the corners of the insert along their widths.

First ascending angle 54 circumscribes the centrally disposed raised island of the insert. A chip deceleration pad 52 is located at each inversely arcuate side region 58 of the island, and the pad and island share the first variable width ascending angle which arises from the groove width surface 50 to the deceleration pad and the nose portions of the island. A second variable width ascending surface 56 rises from the chip deceleration pad to the surface 16 of the centrally raised island.

The insert is configured such that the cutting edge descends from each corner portion of the insert to the mid-point of each flank from a distance of about 0.1 inches to 0.12 inches along an arcuate surface. The feed rate for the insert is preferably from about 0.006 inches to 0.018 IPR and the depth of cut for this insert is preferably 0.01 inches to 0.125 inches.

Those skilled in the art will recognize that various modifications are possible to the insert described herein without departing from the scope and spirit of the invention.

We claim:

1. A polygonal lay down indexable cutting insert for light feed and light depth of cut applications, comprising:
   (a) a top surface having a centrally located raised island having nose portions at each corner separated by inversely arcuate side regions;
   (b) a bottom surface substantially parallel to said top surface, said bottom having a centrally located raised island of the same shape as the island on the top surface;
   (c) a sidewall extending substantially unbroken between said top and bottom surfaces to define a body; said sidewall comprised of a plurality of component side flanks which extend from corner to corner of the polygonal insert;
   (d) a cutting surface formed by the outer periphery of each of the top and bottom surfaces and comprising a cutting edge at the meeting of each component side flank and the top and bottom surfaces; said cutting edge having the shape of a descending arc as measured from each corner to each adjacent corner of the insert; said cutting surface further comprising; a variable width land surface extending rearwardly from said cutting edge; said land surface radiused at each corner of the insert and of narrower width at the corners than along the flanks of the insert body; said land surface having a variable first descending land angle; said land angle being greater at each corner than along the side flanks;
   (e) a groove width surface; said land surface further having a variable second descending land angle adjacent to and rearward of said first variable land angle along the sidewall; said secondary variable land angle extending toward the groove width surface; said first and second variable land angles having surface portion radiused at each corner of the insert body; said groove width surface having a variable width along each flank of the insert body and being narrower at each corner of the insert than at the flanks of the insert;
   (f) a radiused arc surface at each corner of the insert, rearward of said first descending land surface;
   (g) a chip deceleration pad located at each inversely arcuate side region of the island; said pad and island sharing a first variable width ascending angle surface rising from the groove width surface to the deceleration pad and the nose portions of the island; and a second variable width ascending angle surface rising from the deceleration pad to the surface of the centrally raised island.

2. The insert of claim 1, further equipped with a centrally located aperture extending at least partially through the insert body from the top surface to the bottom surface.

3. The insert of claim 1, wherein said first variable land angle is 14° at each corner of the insert and 12° along the flanks of the insert.

4. The insert of claim 1, wherein the cutting edge descends from each corner portion to the mid-point of each flank from about 0.01 inches to 0.012 inches.

5. The insert of claim 1, wherein said feed is about 0.006 inches to 0.018 IPR and said depth of cut is 0.010 inches to 0.125 inches.

6. The insert of claim 1, wherein said first variable descending angle is a positive, rake angle.

7. The insert of claim 1, wherein the second variable descending land angle is 27° along the flanks.

8. The insert of claim 1, wherein said radiused arc is preferably about 0.025 inches.

* * * * *